US008771853B2

(12) United States Patent
Ogawa

(10) Patent No.: US 8,771,853 B2
(45) Date of Patent: Jul. 8, 2014

(54) FUEL CELL ASSEMBLY

(75) Inventor: Soichiro Ogawa, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1462 days.

(21) Appl. No.: 10/656,227

(22) Filed: Sep. 8, 2003

(65) Prior Publication Data

US 2004/0065492 A1  Apr. 8, 2004

(30) Foreign Application Priority Data

Oct. 4, 2002 (JP) ................................. 2002-291883

(51) Int. Cl.
  H01M 2/10 (2006.01)
  H01M 8/24 (2006.01)
  B60K 6/00 (2006.01)
  B60K 8/00 (2006.01)
  B60K 25/10 (2006.01)
  B60L 11/16 (2006.01)

(52) U.S. Cl.
  USPC ............................. 429/34; 429/459; 180/165

(58) Field of Classification Search
  USPC ...................................... 429/34–37
  See application file for complete search history.

(56) References Cited

U.S. PATENT DOCUMENTS

| | | | | |
|---|---|---|---|---|
| 3,856,573 A * | 12/1974 | Groppel | | 429/42 |
| 6,274,258 B1 * | 8/2001 | Chen | | 429/13 |
| 6,400,122 B1 * | 6/2002 | Iwamura | | 320/107 |
| 6,455,179 B1 * | 9/2002 | Sugita et al. | | 429/12 |
| 6,653,008 B1 | 11/2003 | Hirakata et al. | | |
| 6,803,142 B2 * | 10/2004 | Tanaka et al. | | 429/34 |
| 7,045,245 B2 * | 5/2006 | Rock | | 429/37 |
| 2002/0031697 A1 | 3/2002 | Sugita et al. | | |

FOREIGN PATENT DOCUMENTS

| | | |
|---|---|---|
| DE | 100 49 801 A1 | 4/2001 |
| JP | 58-164170 | 9/1983 |
| JP | 8-171926 | 7/1996 |
| JP | 2000-149978 | 5/2000 |
| JP | 2001-143742 A | 5/2001 |
| JP | 2002-367651 | 12/2002 |
| JP | 2002-367652 | 12/2002 |

OTHER PUBLICATIONS

European Search Report Issued in corresponding European Patent Application No. EP 03 01 7783, dated Oct. 5, 2006.
European Search Report issued in European Patent Application No. EP 03 01 7783, dated Feb. 8, 2007.

* cited by examiner

Primary Examiner — A. Echelmeyer
(74) Attorney, Agent, or Firm — McDermott Will & Emery LLP

(57) ABSTRACT

A fuel cell assembly (1) for mounting in a vehicle comprises a fuel cell stack (2) comprising two stack units (2a, 2b) arranged in parallel. Each of the stack units (2a, 2b) comprises a number of fuel cells stacked in a fixed direction. The fuel cell stack (2) is housed in a case (3). The case (3) is supported in the vehicle via a rubber mount (36). The case (3) permits expansion and contraction of the fuel cell stack (2) in the fixed direction so that the expansion and contraction of the fuel cell stack (2) does not exert a force on the rubber mount (36).

13 Claims, 4 Drawing Sheets

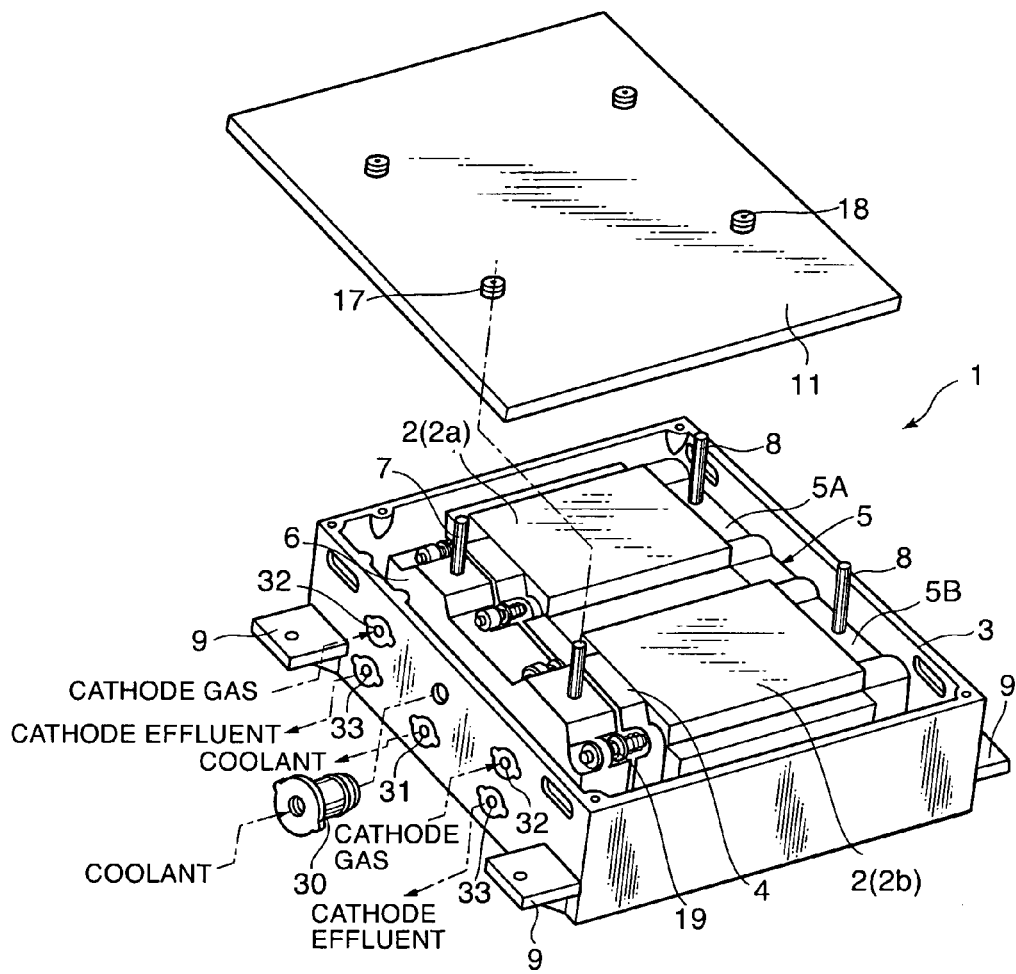
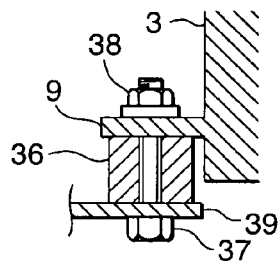
FIG.1
FIG.2

FUEL CELL ASSEMBLY

FIELD OF THE INVENTION

This invention relates to the supporting structure for a fuel cell stack of a fuel cell assembly installed in a vehicle.

BACKGROUND OF THE INVENTION

JP 2001-143742A published by the Japanese Patent Office in 2001 describes a fixing structure for a fuel cell stack in a vehicle-mounted fuel cell system.

The fuel cell stack comprises a number of fuel cells stacked in a fixed direction. A bracket formed in a stacked end of the fuel cell stack is joined to a bracket fixed to the vehicle by a rubber mount. The rubber mount has the function of preventing vehicle vibration from being transmitted to the fuel cell stack by allowing the relative displacement of these two brackets within a fixed range.

SUMMARY OF THE INVENTION

The fuel cell stack generates heat due to a power generating reaction, and expands or contracts according to the temperature variation. This expansion or contraction applies a shear force to the rubber mount via the brackets. When the rubber mount has deformed due to the action of the shear force, the vibration-blocking function of the rubber mount is not fully manifested. Also, if the deformation acts for a long time period, the durability of the rubber mount will be impaired.

It is therefore an object of this invention to improve the supporting structure of a vehicle-mounted fuel cell stack.

In order to achieve the above object, this invention provides a fuel cell assembly mounted in a vehicle, comprising a fuel cell stack comprising plural fuel cells stacked in a fixed direction, a case housing the fuel cell stack and permitting expansion and contraction of the fuel cell stack in the fixed direction, and an elastic member which supports the case in the vehicle.

This invention also provides a fuel cell assembly mounted in a vehicle, comprising a fuel cell stack comprising plural fuel cells stacked in a fixed direction, a case housing the fuel cell stack, a supporting member which supports both ends of the fuel cell stack in the case, and a bolt which fixes the supporting member to the case, the bolt extending in a perpendicular direction to the fixed direction.

The details as well as other features and advantages of this invention are set forth in the remainder of the specification and are shown in the accompanying drawings.

BRIEF DESCRIPTION OF THE DRAWINGS

FIG. 1 is a perspective view of a fuel cell assembly according to this invention.

FIG. 2 is a longitudinal sectional view of a rubber mount according to this invention.

DESCRIPTION OF THE PREFERRED EMBODIMENTS

Figure 3:
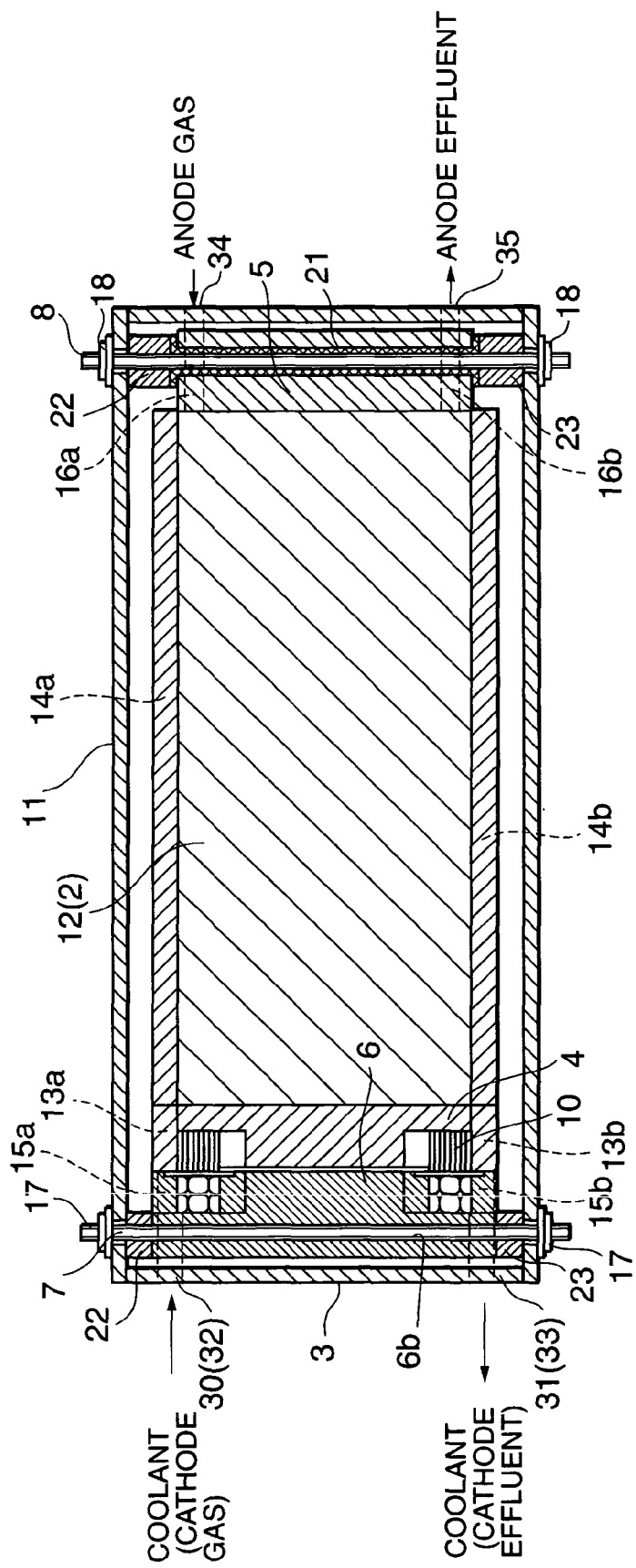
FIG. 3 is a longitudinal sectional view of the fuel cell assembly.

Referring to FIG. 1 of the drawings, a fuel cell assembly 1 for a vehicle installation according to this invention comprises a fuel cell stack 2 housed in a case 3. The fuel cell stack 2 comprises two stack units 2a, 2b disposed in parallel, these being gripped by a common front end plate 4 and rear end plate 5. The stack units 2a, 2b comprise a number of fuel cells stacked in a fixed direction. The front end plate 4 is formed of an electrically conducting material electrically connecting the stack units 2a, 2b in series.

The rear end plate 5 comprises elements 5A, 5B formed of an electrically conducting material. The elements 5A, 5B are electrically insulated from each other. The elements 5A, 5B respectively comprise terminals for extracting current from the stack units 2a, 2b connected in series by the front end plate 4.

A fluid supply/discharge block 6 of an electrically nonconductive resin and having cathode gas and cooling passages is arranged parallel to the front end plate 4.

The fluid supply/discharge block 6, front end plate 4, fuel cell stack 2 and rear end plate 5 are joined together by plural stacking bolts 19.

Figure 5:
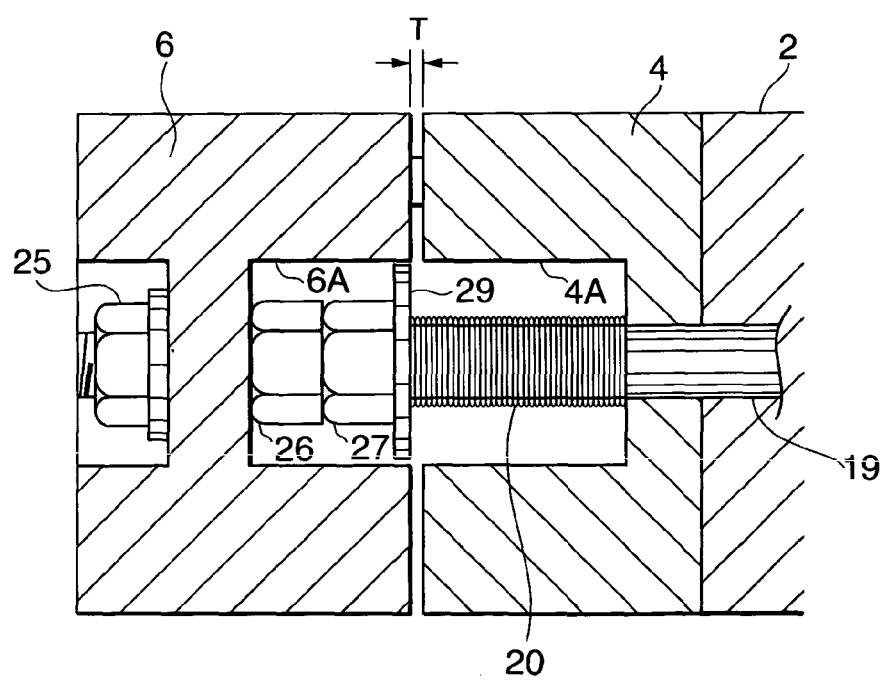
FIG. 5 is a longitudinal sectional view of the fuel cell assembly showing the construction of a stacking bolt according to this invention.

Referring to FIG. 5, one end of the stacking bolt 19 is fixed to the fluid supply/discharge block 6 by plural nuts 25-27. The other end of the stacking bolt 19 is threaded through the front end plate 4, fuel cell stack 2 and rear end plate 5 in the stacking direction of the fuel cells, and the threaded end is fixed by a nut.

A slight gap T is provided between the fluid supply/discharge block 6 and front end plate 4. Adjacent hollows 4A, 6A are formed in the fluid supply/discharge block 6 and front end plate 4 surrounding the stacking bolt 19, coil springs 20 being housed in these hollows 4A, 6A.

The coil spring 20 is fitted to the outer circumference of the stacking bolt 19, and one end is supported by the nuts 26, 27 via a washer 29. The other end of the coil spring 20 penetrates into the hollow 4A to come in contact with the end plate 4.

Due to this construction, the fuel cell stack 2 is constantly pushed against the end plate 5 by the reaction force of the coil spring 20 via the front end plate 4. The fuel cell stack 2 expands in the stacking direction due to the heat generated by power generation by the fuel cells. The expansion of the fuel cell stack 2 due to this heat is permitted within the range if the gap T by the deformation of the coil spring 20.

The fluid supply/discharge block 6, front end plate 4, fuel cell stack 2 and rear end plate 5 are housed in the case 3 in a one-piece construction by the plural stacking bolts 19.

Referring to FIG. 3, two bolt holes 6b are formed through the fluid supply/discharge block 6 in a direction perpendicular to the stacking direction of the fuel cells, front bolts 7 being respectively threaded through these bolt holes. As shown in FIG. 1, the front bolts 7 are situated in front of the center parts of the stack units 2a, 2b.

One end of the front bolt 7 projects from the fluid supply/discharge block 6 outside the case 3 via a spacer 23, and the other end projects outside a cover 11 of the case 3 via a spacer 22. These projections are respectively tightened by nuts 17. A high tensile-strength bolt is preferably used for the front bolt 7. The front bolt 7 does not necessarily project outside the case 3, and may also be fixed to the case 3 inside the case 3.

Figure 6:
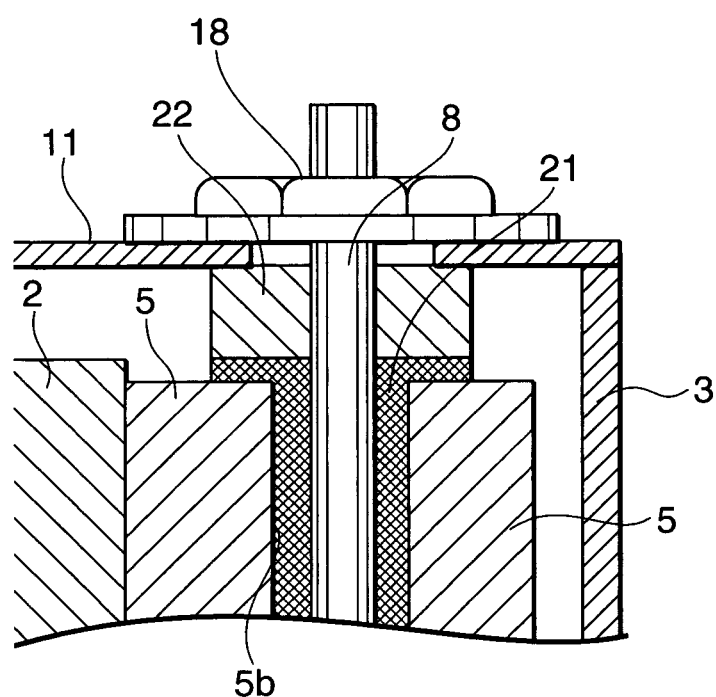
FIG. 6 is a longitudinal sectional view of the essential parts of the fuel cell assembly showing the structure of a rear bolt according to this invention.

Referring to FIG. 6, two bolt holes 5b are formed through the rear end plate 5 in a direction perpendicular to the stacking direction of the fuel cells, rear bolts 8 respectively passing through these bolt holes 5b via a collar 21 of insulating material. As shown in FIG. 1, the rear bolts 8 pass through the center parts of the elements 5A, 5B. One end of the rear bolt 8 projects from the rear end plate 5 outside the case 3 via a spacer 23, and the other end projects outside the cover 11 of the case 3 via a spacer 22. These projections are respectively tightened by nuts 18. A high tensile-strength bolt is preferably used also for the rear bolt 8.

In this way, by fixing the fluid supply/discharge block 6 to the case 3 using the front bolts 7 which pass through the fluid supply/discharge block 6 perpendicularly to the stacking direction of the fuel cells, the load exerted in the stacking direction by the fuel cell stack 2 on the fluid supply/discharge block 6 via the front end plate 4 is distributed over the whole length of the front bolts 7. Also, the load exerted by the fuel cell stack 2 on the rear plate 5 is also distributed over the whole length of the rear bolts 8.

Both the fixed construction of the fluid supply/discharge block 6 using the front bolts 7 and the fixed construction of the rear plate 5 using the rear bolts 8 do not increase the length of the case 3 in the stacking direction of the fuel cells. Therefore, the volumetric density of the fuel cell stack 2 relative to the case 3 can be increased.

Supply manifolds 14a manufactured of resin for respectively distributing anode gas, cathode gas and coolant to each cell, are separately formed on the outer circumference of the stack units 2a, 2b so that they do not mutually interfere. Discharge manifolds 14b manufactured of resin for respectively recovering anode effluent, cathode effluent and coolant from each cell, are also separately formed on the outer circumference of the stack units 2a, 2b so that they do not mutually interfere. Herein, the anode gas is hydrogen, the cathode gas is air and the coolant is water.

Supply of cathode gas and coolant to the stack units 2a, 2b and recovery of cathode effluent and coolant from the stack units 2a, 2b are both performed via the fluid supply/discharge block 6 and front end plate 4. Referring to FIG. 1, cathode gas inlets 32 and outlets 33, and a coolant inlet 30 and outlet 31 are respectively formed in the case 3.

Referring to FIG. 3, regarding the supply of coolant, a coolant supply passage 15a is formed in the fluid supply/discharge block 6, and a pair of coolant supply passages 13a are formed in the front end plate 4. The supply passage 15a communicates with the coolant inlet 30 shown in FIG. 1 formed in the case 3, and each of the supply passages 13a communicates with the coolant supply manifold 14a formed in each of the stack units 2a, 2b. The coolant supply passage 15a in the fluid supply/discharge block 6 is internally bifurcated, and leads to the coolant supply passage 13a formed at two locations in the front end plate 4.

Coolant which has cooled the stack units 2a, 2b passes through a coolant discharge manifold 14b formed in each of the stack units 2a, 2b and through a coolant discharge passage 13b formed at two locations in the front end plate 4, to reach coolant discharge passages 15b formed in the fluid supply/discharge block 6. After the discharge passage 15b have joined inside the fluid supply/discharge block 6, they lead to a coolant outlet 31 formed in the case 3.

Therefore, the main parts of the supply passage 15a and discharge passage 15b formed in the fluid supply/discharge block 6, are formed parallel to the front end plate 4. As described above, the front end plate 4 electrically connects the stack units 2a, 2b in series, so the front end plate 4 is at equal potential over its whole surface. Therefore, the flow direction of coolant in the fluid supply/discharge block 6 after bifurcation or before joining is parallel to the equipotential surface. The fact that the main parts of the supply passage 15a and discharge passage 15b are parallel to the equipotential surface in this way, has a desirable effect on preventing electrical leaks via coolant.

Cathode gas is likewise supplied from the inlets 32 of the case 3 to the stack units 2a, 2b via the cathode gas supply passages 15a, 13a and cathode gas supply manifold 14a. Cathode effluent is discharged from a cathode effluent discharge manifold 14b in each of the stack units 2a, 2b, flows through the cathode gas discharge passages 15b, 13b, and leaves from the outlets 33 of the case 3.

Referring to FIG. 3, anode gas inlets 34 and outlets 35 are formed on the opposite side of the case 3 to the coolant inlet 30 (cathode gas inlets 32) and the coolant outlet 31 (cathode effluent outlets 33), and anode gas is supplied from the inlets 34 to the anode gas supply manifold formed in each of the stack units 2a, 2b via an anode gas supply passage 16a passing through the rear end plate 5. Anode effluent is discharged from an anode effluent manifold formed in each of the stack units 2a, 2b, flows through an anode gas effluent passage passing through each of the elements 5a, 5b, and leaves from the outlets 35 formed on the side of the case 3. The rear end plate 5 does not displace even if the fuel cell stack 2 expands or contracts. Therefore, the provision of the anode gas inlets 34 and outlets 35 in the rear end plate 5 completely prevents anode gas leaks.

Figure 4:
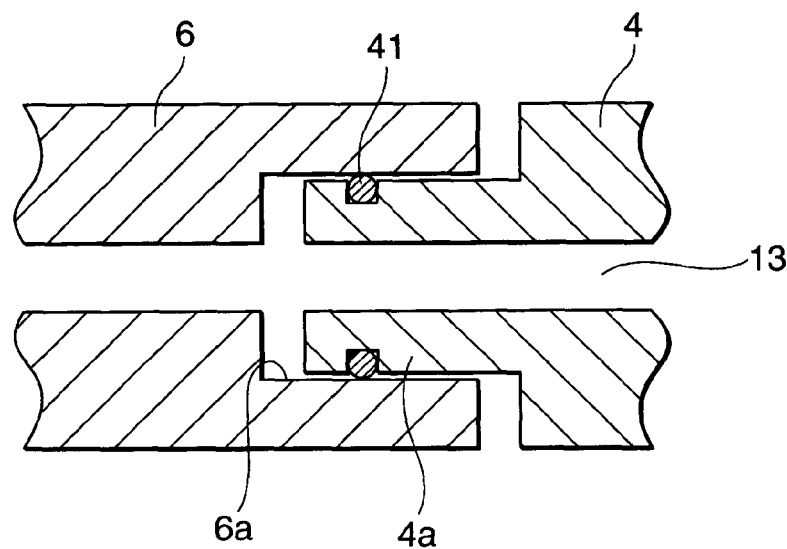
FIG. 4 is a longitudinal sectional view of the essential parts of the fuel cell assembly showing a supply manifold and the expansion/contraction structure of an end plate according to this invention.

On the other hand, as described above, the gap T is provided to absorb expansions and contractions of the fuel cell stack 2 between the fluid supply/discharge block 6 and front end plate 4. This gap T varies according to the expansion and contraction of the fuel cell stack 2. The supply passage 15a after bifurcation in the fluid supply/discharge block 6 and the supply passages 13a formed in the front end plate 4 are connected by the construction shown in FIG. 4 in order to prevent leakage of gas or coolant due to variation of this gap T.

Specifically, a projection 4a formed in the front end plate 4 fits into a depression 6a formed in the fluid supply/discharge block 6. An O-ring 41 in contact with the depression 6a fits onto the projection 4a. The projection 4a slides in the horizontal direction of the diagram inside the depression 6a according to the expansion/contraction of the fuel cell stack 2, and the O-ring 41 prevents gas or coolant leaking from the supply passage 15a (13a). The discharge passage 15b before joining in the fluid supply/discharge block 6 and the discharge passages 13b in the front end plate 4 are also connected through a similar structure.

When this fuel cell apparatus is assembled, the assembly is first built by assembling the fuel cell stack 2, fluid supply/discharge block 6, rear end plate 5 and front end plate 4 in a one-piece construction by the stack bolts 19. The assembly is housed in the case 3, and the front bolt 7 and rear bolt 8 are passed through the cover 11 when the cover 11 closes the case 3. The nuts 17 are used to tighten the front bolts 7 and the nuts 18 are used to tighten the rear bolts 8 projecting from the outside of the cover 11 and the case 3.

Plural brackets 9 are first fixed to the outer circumference of the case 3. Referring to FIG. 2, the bracket 9 is fixed to a bracket 39 fixed to the vehicle body using a bolt 37 and nut 38 via the rubber mount 36.

In this fuel cell assembly 1, the expansion/contraction of the fuel cell stack 2 is absorbed in the case 3, and no load is exerted on the rubber mount 36 supporting the case 3 in the vehicle body. Therefore, the rubber mount 36 can completely fulfil its role of absorbing relative vibrations between the case 3 and the vehicle body. Moreover, as there is no load normally acting on the rubber mount 36, the rubber mount 36 has good durability.

The contents of Tokugan 2002-291883, with a filing date of Oct. 4, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid embodiment, the cathode gas passages and coolant passage were provided in the fluid supply/discharge block 6, and the anode gas passages were formed in the rear end plate 5, but the setting of these passages can be modified as desired.

The embodiments of this invention in which an exclusive property or privilege is claimed are defined as follows:

What is claimed is:

1. A fuel cell assembly mounted in a vehicle, comprising:
   a fuel cell stack comprising plural fuel cells stacked in a fixed direction and a pair of end plates which are stacked on both ends of the plural fuel cells;
   a stacking bolt which penetrates the pair of end plates in the fixed direction and maintains the plural fuel cells in a stacked state;
   a case housing the fuel cell stack; and
   a bolt which penetrates an end plate in a direction perpendicular to the fixed direction, wherein both ends of the bolt are fixed to the case to bear a load exerted in the fixed direction by the fuel cell stack.

2. The fuel cell assembly as defined in claim 1, wherein the pair of end plates comprise a first plate made of an electrically conducting material, and the fuel cell assembly further comprises an insulating member which electrically insulates the bolt which penetrates an end plate in a direction perpendicular to the fixed direction from the first plate.

3. The fuel cell assembly as defined in claim 1, further comprising a rubber mount gripped by a bracket fixed to the case and a bracket fixed to the vehicle.

4. The fuel cell assembly as defined in claim 1, wherein the pair of end plates comprises a front end plate and a rear end plate, a fluid supply/discharge block arranged on the opposite side of the front end plate to the fuel cell stack in the fixed direction, and the bolt comprises a bolt that penetrates the fluid supply/discharge block in the direction perpendicular to the fixed direction and a bolt that penetrates the rear end plate in the direction perpendicular to the fixed direction.

5. The fuel cell assembly as defined in claim 4, further comprising a spring interposed between the front end plate and the fluid supply/discharge block.

6. A fuel cell assembly mounted in a vehicle, comprising:
   a fuel cell stack comprising plural fuel cells stacked in a fixed direction;
   a stacking bolt disposed along the fixed direction to maintain the plural fuel cells in a stacked state;
   a fluid supply/discharge block fitted to an end of the fuel cell stack to supply fluid from outside to each of the plural fuel cells and discharge fluid from each of the plural fuel cells to outside;
   a case housing the fuel cell stack and the fluid supply/discharge block; and
   a bolt which penetrates the fluid supply/discharge block in a direction perpendicular to the fixed direction, wherein both ends of the bolt are fixed to the case to bear a load exerted in the fixed direction by the fuel cell stack.

7. The fuel cell assembly as defined in claim 6, wherein the fuel cell assembly further comprises a first plate supporting one end of the fuel cell stack, a second plate fixed to the other end of the fuel cell stack, and the fluid supply/discharge block is in close contact with the second plate via a gap which permits displacement of the second plate in the fixed direction.

8. The fuel cell assembly as defined in claim 7, further comprising an expansion/contraction mechanism comprising a depression formed in the fluid supply/discharge block, and a projection formed in the second plate and inserted in the depression.

9. The fuel cell assembly as defined in claim 8, wherein the expansion/contraction mechanism further comprises a passage which causes the fluid to flow through the projection between the fluid supply/discharge block and the second plate, and a seal member interposed between the projection and the depression.

10. The fuel cell assembly as defined in claim 7, wherein the second plate is made of an electrically conducting material.

11. The fuel cell assembly as defined in claim 7, wherein the fuel cell stack comprises two stack units arranged in parallel, the stack units are electrically connected in series via the second plate, the case comprises a coolant inlet and outlet, and the fluid supply/discharge block has a supply passage disposed parallel to the second plate which distributes coolant supplied to the inlet between the stack units, and a discharge passage disposed parallel to the second plate which recovers and leads coolant which has cooled the stack units to the outlet.

12. The fuel cell assembly as defined in claim 7, wherein the fluid supply/discharge block is made of an electrically nonconductive material.

13. The fuel cell assembly as defined in claim 6, further comprising a rubber mount gripped by a bracket fixed to the case and a bracket fixed to the vehicle so as to support the case in the vehicle.

* * * * *